(12) United States Patent
Loi et al.

(10) Patent No.: US 9,933,082 B2
(45) Date of Patent: Apr. 3, 2018

(54) FITTING BODY FOR A SANITARY FITTING AND PRODUCTION METHOD

(71) Applicant: Grohe AG, Hemer (DE)

(72) Inventors: Thomas Loi, Luedenscheid (DE); Pia Theyson, Hemer (DE); Hartwig Philipps-Liebich, Menden (DE)

(73) Assignee: Grohe AG, Hemer (DE)

( * ) Notice: Subject to any disclaimer, the term of this patent is extended or adjusted under 35 U.S.C. 154(b) by 96 days.

(21) Appl. No.: 15/065,402

(22) Filed: Mar. 9, 2016

(65) Prior Publication Data

US 2016/0265675 A1    Sep. 15, 2016

(30) Foreign Application Priority Data

Mar. 9, 2015   (DE) .................. 10 2015 002 894

(51) Int. Cl.
| | |
|---|---|
| *E03C 1/00* | (2006.01) |
| *F16K 27/00* | (2006.01) |
| *E03C 1/04* | (2006.01) |
| *B29C 65/70* | (2006.01) |
| *B29L 31/00* | (2006.01) |

(52) U.S. Cl.
CPC .............. *F16K 27/00* (2013.01); *B29C 65/70* (2013.01); *E03C 1/0404* (2013.01); *B29L 2031/00* (2013.01)

(58) Field of Classification Search
CPC ........................................................ E03C 1/04
USPC ........................................................... 4/696
See application file for complete search history.

(56) References Cited

U.S. PATENT DOCUMENTS

| 5,579,823 A | * | 12/1996 | Mikol | ................... E03C 1/0404 164/98 |
| 6,817,379 B2 | * | 11/2004 | Perla | ..................... E03C 1/0404 137/801 |
| 8,789,276 B2 | * | 7/2014 | Thomas | .................... E03C 1/04 29/460 |
| 9,573,191 B2 | * | 2/2017 | Jagtap | .................... B22D 19/00 |
| 2006/0254650 A1 | * | 11/2006 | Wu | ........................... E03C 1/04 137/375 |

FOREIGN PATENT DOCUMENTS

DE   20 2006 001 465 U1   7/2006

* cited by examiner

*Primary Examiner* — Lori Baker
(74) *Attorney, Agent, or Firm* — Muncy, Geissler, Olds & Lowe, P.C.

(57) ABSTRACT

A fitting body for a sanitary fitting and a method for producing a fitting body for a sanitary fitting. The fitting body has a base body having at least one receptacle, wherein in a receiving base of the at least one receptacle at least one laterally open channel is provided. The base body is connected in the region of the at least one receptacle with at least one cover, wherein between the at least one cover and the at least one channel, at least one waterway is formed. The at least one cover is at least partially disposed in the receptacle and is mostly covered by a molding composition on a cover outer surface. The fitting body is produced easily and with a minimum of sealing points, and the course taken by the waterways is easily seen from the outside.

8 Claims, 2 Drawing Sheets

FITTING BODY FOR A SANITARY FITTING AND PRODUCTION METHOD

This nonprovisional application claims priority under 35 U.S.C. § 119(a) to German Patent Application No. 10 2015 002 894.4, which was filed in Germany on Mar. 9, 2015, and which is herein incorporated by reference.

BACKGROUND OF THE INVENTION

Field of the Invention

The present invention relates to a fitting body for a sanitary fitting and a method for producing a fitting body for a sanitary fitting. The fitting body is in particular a part or a component of a sanitary fitting.

Description of the Background Art

Sanitary fittings can include thermostat valves and/or mixing valves, in particular thermostatic mixing valves for bathtubs, wall basins, handheld showerheads or the like. To this end, the sanitary fittings regularly have a hot water inlet for hot water and a cold water inlet for cold water. In addition, the sanitary fittings regularly have an outlet for mixed water. The hot water and the cold water can be mixed within the sanitary fitting by means of a thermostatic valve to reach a predetermined water temperature. In addition, the water flow or the amount of water can be adjusted by means of a flow control valve. The valves can be actuated by means of separate actuators, or by means of a common actuator.

Water valves are known in which the water channels or waterways are formed in a base body. Such a body is made, for example, of metal, plastic or the like. In such a body, the water channels are inserted into the base body during the manufacturing process, in particular during a casting process or an injection molding process, by means of suitable shaping tools.

If complex water channels are to be realized in a molded body, it can lead to problems during demolding of such a body. When casting such a body, the complex water channels are regularly realized within the body by slide valves in contact with one another. Such slides are required if a water channel represents an undercut in the demolding direction. In such a manufacturing process, sharp geometries regularly arise which have an unfavorable influence on the water flow and the noise generation within a sanitary fixture.

To improve the demolding properties, undercuts in the demolding direction of the respective water channels or waterways should be avoided. For this purpose, however, it is usually necessary to divide the base body into a plurality of assemblies. Disadvantages in this case are the additional sealing points and junctions that arise, and the associated requirement for increased space. In addition, manufacturing tolerances should be taken into account when assembling the individual modules.

Another way to avoid undercuts in demolding is to demold in parallel the water channels or waterways in the mold. This produces, relative to a separating surface of the base body, open water channels that are not undercut in the viewing direction to the separating surface. However, such production has the disadvantage that the open water channels must be closed after demolding. To this end, for example, an appropriate cover can be applied to the separating surface. The fixing of such a cover can be realized by gluing, screwing, friction welding, vibration welding or the like. This also depends on whether the base body is formed with plastic or metal. Such a manufacturing process is generally performed in several stages because the closure of the open channels is downstream of the production of the base body and the demolding of the base body. Such manufacturing processes are subject to fluctuations, so that in the context of mass production, the result can be guaranteed reliably and uniformly only with great effort.

In particular, the fixing of the cover poses some problems in series production. In general, a one-piece cover is used to close all the channels. The fixing of the cover is relatively time consuming with the known methods of gluing, screwing, friction welding and vibration welding. If several and in particular different covers are used, the time required increases accordingly. In addition, there is the problem that the orientation of the cover relative to the open water channels is usually not very accurate with the known methods. In particular, using a one-piece cover to close all the water channels of a base body results in cumulative inaccuracies in the alignment of the base body and the cover due to manufacturing tolerances.

SUMMARY OF THE INVENTION

It is therefore an object of the present invention to at least partially solve the described problems related to the prior art. In particular, a fitting body for a sanitary fitting is provided, which is easy to manufacture, requiring a small installation space and having sealing points as few or as small as possible. In addition, demolding is to be made easier and undercuts are to be avoided during demolding. Moreover, the course taken by the waterways in the fitting body should be recognizable when viewed from the outside. In particular, a manufacturing method for a fitting body is to be provided, which allows a simple as possible production of a compact fitting body with sealing points as few and as small as possible. In addition, an easy demolding of the individual components should be provided and undercuts are to be avoided. Additionally, the tightness of the waterways should be ensured at the fitting body over a long operational period.

In an exemplary embodiment, a fitting body for a sanitary fitting is provided, having a base body with at least one receptacle. In a receiving base of the at least one receptacle, at least one laterally open channel is provided. The base body is connected in the region of the at least one receptacle with at least one cover. Between the at least one cover and the at least one channel, at least one waterway is formed. The at least one cover is at least partially disposed in the receptacle. The outer surface of the at least one cover is predominantly covered by a molding composition.

This advantageously allows a fast, simple and exact closing of the laterally open channels of the base body. This is particularly due to the fact that the laterally open channel is provided in a receiving base of a receptacle, and that the orientation of the cover to the laterally open channel is provided in a simple manner and with great precision, in particular through a guide or alignment of the cover within the receptacle. Undercuts in the demolding direction of the base body (at least undercuts of the open channels) can thereby be avoided due to the laterally open channels. Due to this, in particular sharp edges are avoided in the production of the base body and the channels can be produced in a very streamlined manner. This is advantageous to the flow of water and makes it possible to minimize the noise inside the fitting body. This type of formation of waterways produces a solid component, in particular a plastic part, with a minimum number of external sealing points, which in particular also form a relatively small sealing surface (only) in the adjacent area around the waterways. By covering with the molding composition, and in particular by overmolding with the molding composition, a strong and readily produced tightness of the cover and thus the fitting body is ensured. Another advantage of the technical solution is that the course taken by the waterways can be easily recognized from the outside, wherein a molding composition with a color that differs from the color of the base body can be particularly favorable.

A further advantage of the technical solution is that a simple closing and sealing of the individual open water channels is possible. Here it is also possible to simply and quickly, particularly at the same time, close and seal multiple open channels with different covers by covering them with the molding composition, in particular by means of overmolding with the molding composition. A particularly suitable solution for mass production is thereby indicated.

The base body can be designed as a cast component, for example, made as a monolithic or integral cast part. For this purpose, the base body can be produced in a casting tool, in particular an injection mold and preferably in a plastics injection mold. The laterally open channels are introduced into the base body in particular during the casting process or the injection molding process by means of suitable shaping tools.

The base body can have at least one receptacle. The receptacle can be formed in the manner of a depression or a recess and/or an elevation or a projection (at least partially circumferential to the channel). The base body may hereby substantially be formed plate-shaped or disk-shaped, said at least one depression/recess or at least one elevation/projection extending inward or outward from the base. The body may be formed integrally with the receptacle. In this regard, the terms disk-shaped or plate-shaped mean that the spread of the base body in a horizontal direction or width is greater than the spread of the base body in a vertical direction or height.

In a receiving base of the at least one receptacle, at least one laterally open channel is provided. Laterally (or longitudinally and/or transversely) open hereby means, for example, that the channel can be designed open within the base body in a direction transverse to its direction of propagation. This serves to avoid undercuts of the channel in the demolding direction of the base body. In other words, this also means that the channels are laterally open, based on a separating surface or separating plane of the base body, and are not undercut in a viewing direction to the separating plane of the base body. Thus, a maximum cross-sectional area of the open channel is situated in particular in the separating plane of the base body. The open channel in this case runs parallel to this separating plane or separating surface and in particular along the separating surface. The laterally open channel—and particularly the not undercut cross-section of the open channel visible in the viewing direction to the separating plane—is covered or closed during assembly of the fitting body by means of the cover.

The base body can be connected to at least one cover in the region of the at least one receptacle. It is preferred that for each waterway, a (single) absorption and accordingly a (single) cover are provided. Such a connection takes place in particular by means of covering with molding composition. Preferably, the base body is connected to the at least one cover in the at least one receptacle. Thus, cover and body are interconnected in a completed fitting body.

At least one waterway can be formed between the at least one cover and the at least one channel. In other words, this also means that the waterway is enclosed along the flow direction of the water (only) by the channel and the cover. Usually several waterways are provided that guide, for example, cold water, hot water and/or mixed water through the fitting body. The waterway may be formed circular, oval or rectangular in cross-section. A cross section of the waterway is essentially understood to mean perpendicular to a flow direction or conveying direction of the waterway. The cover is in particular not merely a flat closure plate, but preferably has a curved, especially round shaped or square inner molding.

The at least one cover can be at least partially disposed in the receptacle. Preferably, the cover is arranged entirely in the receptacle. However, this is not mandatory, because at least a part of a cover outer surface may protrude outwards (longitudinally and/or laterally) beyond the receptacle or the projections. The arrangement of the cover in the receptacle has the advantage that the cover can be easily and accurately aligned with the laterally open channel in the receptacle area of the receptacle.

The at least one cover can also be formed as a cast component. To this end, the cover can be made in a casting tool, in particular in an injection mold and preferably in a plastics injection mold. However, this is not mandatory, because the cover can also be manufactured by other manufacturing methods. The cover is preferably formed with or made of metal or plastic. When the cover is formed with metal, it may, for example, be produced by means of a deep drawing process, swaging or the like. The at least one cover separates the area of the channels that later guide water, namely the at least one waterway, from the area where the molding composition is arranged. Such an area can, for example, be a receptacle at least partially filled with molding composition.

Each cover can be integrally formed. However, it is possible that a laterally open channel is closed to the outside by means of several covers. In particular, each waterway along the flow direction of the water is thus bounded or enclosed to the outside by the channel and by means of at least one cover.

The at least one cover can be connected with the base body exclusively by means of the molding composition. An additional bonding or additional form-fit or a positive connection between the at least one cover and the base body is not absolutely necessary, but also not excluded. "Cohesive" connections are connections in which the connection partners are held together by atomic or molecular forces. A cohesive connection can be made, for example, in the form of a welded joint, in particular under the influence of heat. Since the covers need not in particular be bonded or welded to the base body, the tightness between cover and base body should be provided by means of an abutment of the cover as exact as possible.

The tightness between the cover and the base body should prevent the molding composition from entering the waterway during covering or overmolding. In particular, the cover abuts a separating surface of the base body, which arises from the mold upon separation or demolding of the base body. The separating surface is situated in a separating plane of the base body. In respect of tightness, it is advantageous if the separating surfaces lie along the channels in one plane. It is particularly preferred if all the separating surfaces of a base body are in a common plane. However, this is not absolutely necessary because the separating surfaces can also be located in multiple or different, in particular mutually inclined, planes. It is hereby preferred that the planes are realized with light transitions. In particular, the lateral open channels are bordered on both sides with separating surfaces along an extension direction of the channel. It is preferred that these separating surfaces lie in one plane in order to ensure an abutment of a cover as even and precise as possible. This is advantageous because the cover, when it is molded on the outside with the molding composition, must withstand a high injection pressure in the injection mold, in particular the plastics injection mold, and should be sealed against the molding composition, in particular against a liquid plastic compound.

The at least one cover is covered on a cover outer surface mainly by a molding composition, i.e. in particular at least 70% or 80%. All border areas of the cover and the base body together are thereby included (sealing surfaces). Preferably, the cover outer surface is (nearly or even) completely covered with the molding composition. In particular, the at least one receptacle above the cover outer surface is at least partially, and preferably completely, filled with the molding composition.

According to an embodiment it is proposed that the cover outer surface is overmolded with the molding composition. This means in particular that the base body and the at least one cover, which was previously arranged in the at least one receptacle, are introduced into an injection molding tool and the cover outer surface (inside the receptacle) is overmolded by means of a liquid molding composition. Such an overmolding of the cover outer surface can also be understood as an overspraying of, in particular, an outer surface of the cover. By means of the overmolding, the covering with the molding composition can advantageously be carried out as soon as possible and in particular, in series production. Here, for example, it is also possible that several cover outer surfaces of a fitting body or several cover outer surfaces of multiple fitting bodies are overmolded in one process step, in particular at the same time.

According to an embodiment, it is proposed that between the molding composition and at least one inner wall of the at least one receptacle, a cohesive connection is established. This advantageously allows for a simple connection between the base body and the cover. Due to the adhesive bond between the molding composition and the inner wall of the receptacle, a particularly high compressive strength and tightness of the fitting body outwards is achieved in an advantageous manner.

According to an embodiment, it is proposed that within the at least one receptacle, at least one collar is formed with a contact surface for the at least one cover. The collar (preferably encircling the channel) can here be formed in the manner of a step, a (snap-in) shoulder or the like. This means in particular that the inner walls of the receptacle do not directly or immediately pass into the open channel, but that between an inner surface of the channel and the inner walls of the receptacle, a collar or a step is provided. In this context, the contact surface can be understood as a separating surface, as already explained above. A channel preferably has in each case a contact surface on both sides along its direction of propagation on which the cover or an underside of the cover can fit as flat and closely as possible. If a channel has rounded ends, a contact surface may edge the canal. For this purpose, the contact surfaces preferably lie in one plane.

According to an embodiment it is proposed that at least the base body, the at least one cover or the molding composition is or are formed with a plastic or silicone. For example, at least the base body, the at least one cover or the molding composition are made of plastic or include a plastic. However, this is not mandatory, because at a minimum, the at least one cover or the base body may be formed with or made of metal. The fact that the base body and the (each) cover are formed with or made of plastic is particularly advantageous if, for example, drinking water should not come into contact with metal. However, the base body, the at least one cover and the molding composition can be formed with or made of different plastics.

The molding composition can be formed with or made of a particularly strong or rigid plastic. This advantageously results in that the component strength of the fitting body is determined in large part by the molding composition. It is further preferred that the molding composition is color-formed or color-coded such, that the waterways viewed from the outside are easily recognized.

According to an embodiment it is proposed that the at least one cover has local positioner on the outside for orientation of the at least one cover with respect to the at least one channel within the at least one receptacle. As a positioner, for example, catch mechanisms and/or snap connections may be provided. On an outer periphery of the cover, for example, locally outwardly directed bulges can also be provided as a positioner. The local positioner allows in an advantageous manner for the cover to be accurately aligned within the at least one receptacle. In particular, an accurate alignment between a cover and a channel to be covered by this cover can thus be achieved. Due to the accurate positioning or alignment of the at least one cover in the at least one receptacle, an especially strong tightness between the cover and channel can be achieved. In addition, due to the exact alignment within the waterways, unnecessary extra edges can be avoided, and manufacturing tolerances can be reduced.

According to an exemplary embodiment, a method for producing a fitting body for a sanitary fitting is proposed, which comprises at least the following steps:

a) providing at least a cover and a base body with at least one receptacle, wherein in a receiving base of the at least one receptacle at least one laterally open channel is provided, b) arranging at least a portion of the at least one cover in the at least one receptacle, wherein said at least one cover is placed on the base body in the region of the at least one receptacle, wherein between the at least one cover and the at least one channel at least one waterway is formed, c) covering a predominant proportion of a cover outer surface of the at least one cover with a molding composition.

The above-indicated sequence of steps arises during production of a fitting body. However, it is also possible to produce a plurality of fitting bodies by means of the described production method in parallel or at the same time, particularly in the context of mass production. The cover outer surface in this case should in particular not be covered with the molding composition before the at least one cover is arranged in the at least one receptacle.

In step a), the provision of the at least one cover and the base body is preferably carried out by means of one casting operation, more preferably by means of one injection molding process, and most preferably in each case by means of a plastic injection molding process. In particular, the provision in step a) can be carried out in a first process step and in particular in a first tool mold. Regularly, different molds, in particular separated from one another, are hereby used for the at least one cover and the base body. If at least one cover and the base body are provided of the same material, they may, however, also be produced in a common mold with corresponding recesses.

In step b), the positioning of at least a portion of the at least one cover in the at least one receptacle takes place, in particular such, that a cover underside of the at least one cover is inserted in the at least one receptacle, and the cover underside comes to rest on at least one separating surface or at least one contact surface in the receptacle.

According to an embodiment, it is proposed that within the at least one receptacle at least one collar is formed with a contact surface and wherein in step b), the at least one cover rests against the at least one contact surface. In addition, reference can be made extensively to the preceding explanations in respect of the collar and the contact surface.

According to an embodiment it is proposed that in step c), the cover outer surface is overmolded with the molding composition. For this purpose, reference can also be fully made to the preceding explanations in respect of the overmolding. In particular, the overmolding in step c) can be carried out in a second process step, and in particular in a second tool mold.

According to an embodiment it is proposed that in step c), a cohesive connection is produced between the molding composition and at least one inner wall of the at least one receptacle. Here too, the preceding explanations of the cohesive connection can be referenced in their entirety for clarification of this process step.

The details, features and advantageous embodiments previously discussed in connection with the fitting body may accordingly also occur during the manufacturing process presented here, and vice versa. In that respect, reference is made fully to the statements there for a more detailed characterization of the features.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
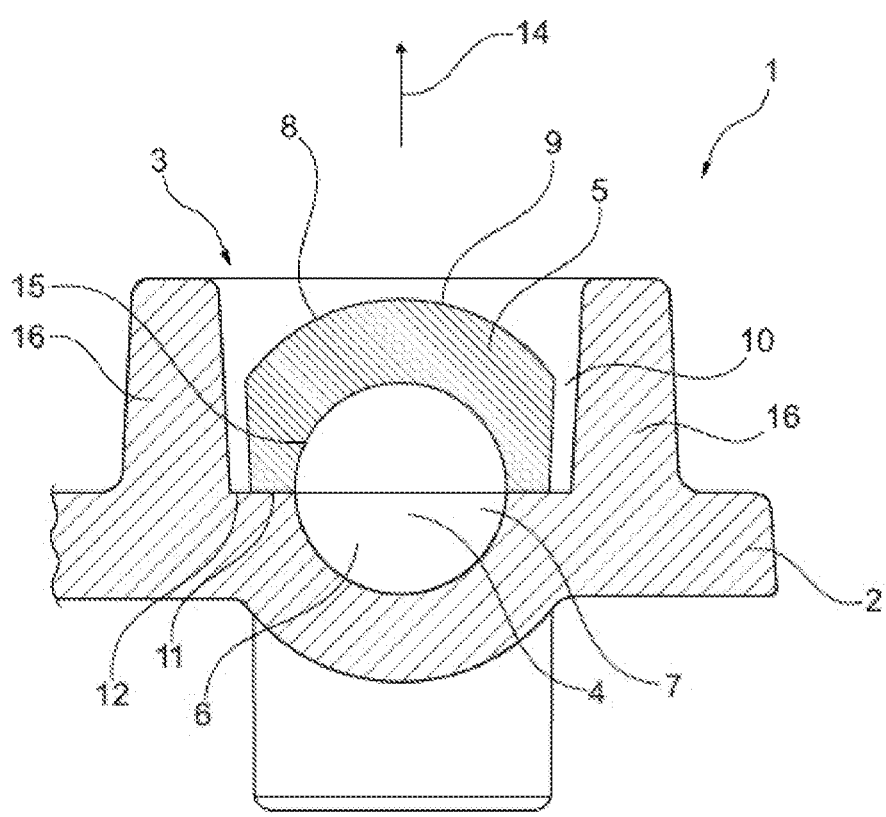
FIG. 1 is a sectional view of a fitting body.

FIG. 1 shows a fitting body 1 in a sectional view. The fitting body 1 has a base body 2 with a receptacle 3. According to the representation of FIG. 1, the receptacle 3 is edged or surrounded in each case by a projection 16 on the left and right, which may optionally be formed as a single circumferential projection. The base body 2 and the projections 16 are formed here as a one-piece plastic injection molded part. The base body 2 is designed substantially disk-shaped or plate-shaped.

In a receiving base 4 of the receptacle 3, a laterally open channel 6 is formed. The receptacle 3 and the channel 6 are not undercut in a demolding direction 14. This ensures a particularly good demolding of the base body.

Within the receptacle 3, viewed from the sectional view of FIG. 1, two collars 11 are formed left and right of the open channel 6, each having a contact surface 12 for a cover 5, wherein the collar 11 can be optionally formed as a single, circumferential collar. The contact surfaces 12 each represent a separating surface. During demolding, a "separating surface" refers to the separation between the base body 2 and the corresponding molding tool, and in the case shown here, the separating surface is the bearing surface or connection surface or contact surface between the base body 2 and the cover 5.

The illustration of FIG. 1 shows that the cover 5 is not provided as a plane or flat cover, but rather has a round-shaped inner molding 15. A waterway 7 is formed between the cover 5 and the channel 6. The waterway 7 here is circular in cross section.

A cover outer surface 8 of the cover 5 is covered with a molding composition 9. In the present case, the cover outer surface 8 has been overmolded with the molding composition 9. In addition, a cohesive connection is made between the molding composition 9 and at least one inner wall 10 of the receptacle 3. In the sectional view of FIG. 1, the cohesive connection is to the left and right of the inner walls 10.

In the present case, the base body 2, the cover 5 and the molding composition are each formed with or from a plastic. It can be seen that the plastic of the molding composition has a different color than the plastic of the base body 2. Thus, the course taken by the waterway 7, which is located below the molding composition 9, can be easily seen from the outside.

FIG. 1 also shows that the receptacle 3 is completely filled with the molding composition 9 above the cover outer surface 8, that it extends approximately up to the height of the receptacle 3, and that the cover 5 is completely covered.

Figure 2:
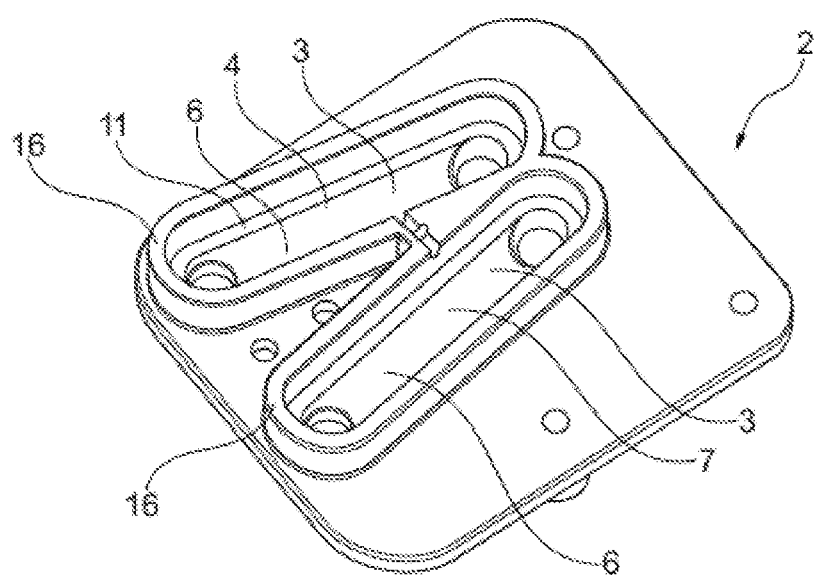
FIG. 2 is a perspective view of a base body.

FIG. 2 illustrates a perspective view of a base body 2. As shown in FIG. 2, the base body 2 has two receptacles 3, each having a receiving base 4. Each receiving base 4 is provided with a laterally open channel 6. The two laterally open channels 6 can be closed with a cover 5 for forming a waterway 7 in each case. The two receptacles 3 are each framed or limited by a projection 16. In addition, the two open channels 6 are each edged by a collar 11. The channels 6 are each formed with round ends and edged by the collar 11.

Figure 3:
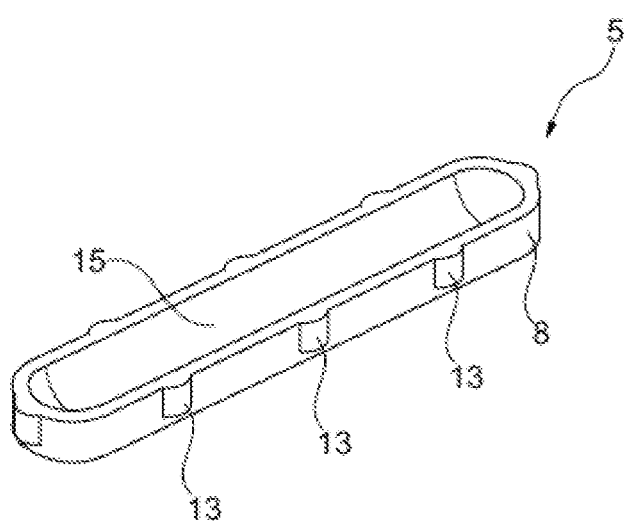
FIG. 3 is a perspective view of a cover.

FIG. 3 shows a perspective view of a cover 5. It can be seen that the cover 5 has a round-shaped inner molding 15. For the exact alignment of the cover 5 within a receptacle 3, the cover outer surface 5 has a local positioner 13. The positioner 13 can each be formed in the manner of a local external curvature.

Thus, a fitting body and a method for manufacturing a fitting body are shown for a sanitary fitting, wherein said fitting body is to be produced easily and with a minimum of sealing points, and wherein the course taken by the waterways is easily seen from the outside. In addition, the fitting body is simple and can in particular be produced in the context of mass production and requires little space. In particular, a base body of the fitting body has good mold release properties because the open channels of the base body are formed in a demolding direction without undercuts.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fitting body for a sanitary fitting, the fitting body comprising:
    a base body having at least one receptacle, the at least one receptacle having a receiving base;
    at least one laterally open channel in the receiving base of the at least one receptacle;
    at least one cover that covers the base body; and at least one waterway formed between the at least one cover and the at least one laterally open channel, wherein the at least one cover is disposed in the at least one receptacle and a cover outer surface of the at least one cover is covered by a molding composition.

2. The fitting body according to claim 1, wherein the molding composition is cohesively connected to at least one inner wall of the at least one receptacle.

3. The fitting body according to claim 1, wherein at least one collar is provided within the at least one receptacle, the at least one collar having a contact surface for the at least one cover.

4. The fitting body according to claim 1, wherein the base body, the at least one cover and the molding composition are a plastic or silicone.

5. The fitting body according to claim 1, wherein the cover outer surface has a local positioner adapted to align the at least one cover relative to the at least one channel within the at least one receptacle.

6. A method for producing a fitting body for a sanitary fitting, the method comprising:

providing at least one cover and a base body having at least one receptacle, wherein a receiving base of the at least one receptacle has at least one laterally open channel;

arranging the at least one cover in the at least one receptacle, such that the at least one cover is placed against the base body in the at least one receptacle, wherein at least one waterway is formed between the at least one cover and the at least one laterally open channel; and covering a cover outer surface of the at least one cover with a molding composition.

7. The method according to claim 6, wherein at least one collar is provided within the at least one receptacle, the at least one collar having a contact surface, and wherein, the at least one cover is placed against the contact surface.

8. The method according to claim 6, wherein the molding composition is cohesively connected to at least one inner wall of the at least one receptacle.

\* \* \* \* \*